United States Patent [19]

Mahalingaiah et al.

[11] Patent Number: 6,016,545
[45] Date of Patent: Jan. 18, 2000

[54] REDUCED SIZE STORAGE APPARATUS FOR STORING CACHE-LINE-RELATED DATA IN A HIGH FREQUENCY MICROPROCESSOR

[75] Inventors: Rupaka Mahalingaiah; Andrew McBride; Thang M. Tran, all of Austin, Tex.

[73] Assignee: Advanced Micro Devices, Inc., Sunnyvale, Calif.

[21] Appl. No.: 08/991,694

[22] Filed: Dec. 16, 1997

[51] Int. Cl.[7] .................................................. G06F 9/38
[52] U.S. Cl. ........................ 712/238; 712/23; 712/233; 712/237; 711/125; 711/128
[58] Field of Search ............................... 712/10, 23, 240, 712/213, 214, 215, 234, 239, 238, 233, 237; 711/125, 128

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 711/2 |
| 4,807,115 | 2/1989 | Torng | 712/215 |
| 4,858,105 | 8/1989 | Kuriyama et al. | 712/235 |
| 4,928,223 | 5/1990 | Dao et al. | 712/247 |
| 5,053,631 | 10/1991 | Perlman et al. | 708/583 |
| 5,058,048 | 10/1991 | Gupta et al. | 708/583 |
| 5,129,067 | 7/1992 | Johnson | 712/213 |
| 5,136,697 | 8/1992 | Johnson | 712/215 |
| 5,142,634 | 8/1992 | Fite et al. | 712/240 |
| 5,226,126 | 7/1993 | McFarland et al. | 712/218 |
| 5,226,130 | 7/1993 | Favor et al. | 712/238 |
| 5,651,125 | 7/1997 | Witt et al. | 712/218 |
| 5,774,710 | 6/1998 | Chung | 712/238 |
| 5,794,028 | 8/1998 | Tran | 712/240 |
| 5,822,575 | 10/1998 | Tran | 712/239 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

"Superscalar Microprocessor Design," Mike Johnson, Advanced Micro Devices, Inc., PTR Prentice Hall, Englewood Cliffs, New Jersey, pp. 71–75, 1991.

Intel, "Chapter 2: Microprocessor Architecture Overview," 1994, pp. 2–1 through 2–4.

Michael Slater, "AMD'S K5 Designed to Outrun Pentium," Microprocessor Report, vol. 8, No. 14, Oct. 24, 1997, 7 pages.

Sebastian Rupley and John Clyman, "P6: The Next Step?," PC Magazine, Sep. 12, 1995, 16 pages.

(List continued on next page.)

*Primary Examiner*—Meng-Al T. An
*Assistant Examiner*—Nabil El-Hady
*Attorney, Agent, or Firm*—Conley, Rose & Tayon; Lawrence J. Merkel

[57] ABSTRACT

A microprocessor stores cache-line-related data (e.g. branch predictions or predecode data, in the illustrated embodiments) in a storage which includes fewer storage locations than the number of cache lines in the instruction cache. Each storage location in the storage is mappable to multiple cache lines, any one of which can be associated with the data stored in the storage location. The storage may thereby be smaller than a storage which provides an equal number of storage locations as the number of cache lines in the instruction cache. Access time to the storage may be reduced, therefore providing for a higher frequency implementation. Still further, semiconductor substrate area occupied by the storage may be decreased. In one embodiment, the storage is indexed by a subset of the index bits used to index the instruction cache. The subset comprises the least significant bits of the cache index. In other words, the cache lines which share a particular storage location within the storage differ in the most significant cache index bits. Therefore, code which exhibits spatial locality may experience little conflict for the storage locations.

23 Claims, 8 Drawing Sheets

OTHER PUBLICATIONS

Tom R. Halfhill, "AMD K6 Takes on Intel P6," BYTE, Jan. 1996, 4 pages.

"*Intel Architecture Software Developer's Manual, vol. 1: Basic Architecture*" Intel Corporation, Prospect IL, 1996, 1997, Chapter 8: Programming with The Intel MMX™ Technology, pp. 8–1 through 8–15.

Holstad, S., "Tutorial Tuesday: Decoding MMX" Jan. 14, 1997, Earthlink Network, Inc. copyright 1997, 5 pages (see http://www.earthlink.net/daily/Tuesday/MMX).

"Intel MMX™ Technology—Frequently Asked Questions" 6 pages (see http://www.intel.com/drg/mmx/support/faq/htm).

REDUCED SIZE STORAGE APPARATUS FOR STORING CACHE-LINE-RELATED DATA IN A HIGH FREQUENCY MICROPROCESSOR

BACKGROUND OF THE INVENTION

1. Field of the Invention

This invention relates to microprocessors and, more particularly, to caching mechanisms for microprocessors.

2. Description of the Related Art

Superscalar microprocessors achieve high performance by executing multiple instructions per clock cycle and by choosing the shortest possible clock cycle consistent with the design. Conversely, superpipelined microprocessors include a large number of pipeline stages for executing an instruction, such that an extremely short clock cycle may be supported. As used herein, the term "clock cycle" or "clock cycle time" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises decoding the instruction, executing the instruction, and storing the execution results in the destination identified by the instruction).

In order to further increase performance, microprocessors typically include one or more caches for storing instructions and data. A cache is a storage device configured onto the same semiconductor substrate as the microprocessor, or coupled nearby. The cache may be accessed more quickly than a main memory system coupled to the microprocessor. Generally speaking, a cache stores data and/or instructions from the main memory system in cache lines. A cache line comprises a plurality of contiguous bytes which are allocated/deallocated from the cache as a unit. A certain number of low order bits sufficient to uniquely identify each byte within the cache line is referred to herein as the "offset" of the byte within the cache line. The remaining bits of the address form a tag which may be used to refer to the entire cache line. As used herein, the term "address" refers to a value indicative of the storage location within main memory corresponding to one or more bytes of information.

Caches may be organized into a "set-associative" structure. In a set-associative structure, the cache lines are accessed as a two-dimensional array having rows and columns. Alternatively, a direct-mapped structure may be used in which a single column is provided. When a cache is searched for bytes residing at an address, a number of bits from the address are used as an "index" into the cache. The index selects a particular row within the two-dimensional array, and therefore the number of address bits required for the index is determined by the number of rows configured into the cache. The act of selecting a row via an index is referred to as "indexing". The index is derived from one or more bits of the address exclusive of the offset portion of the address. Since the index portion of the address identifies the row of the cache at which the cache line is stored, access to the cache line implies that the index portion of the access address matches the index portion of the tag address. Therefore, the tag address stored within the cache may exclude the index portion of the address (as well as the offset portion).

An important feature of a superscalar microprocessor (and a superpipelined microprocessor as well) is its branch prediction mechanism. The branch prediction mechanism indicates a predicted direction (taken or not-taken) for a branch instruction, allowing subsequent instruction fetching to continue within the predicted instruction stream indicated by the branch prediction. A branch instruction is an instruction which causes subsequent instructions to be fetched from one of at least two addresses: a sequential address identifying an instruction stream beginning with instructions which directly follow the branch instruction; and a target address identifying an instruction stream beginning at an arbitrary location in memory. Unconditional branch instructions always branch to the target address, while conditional branch instructions may select either the sequential or the target address based on the outcome of a prior instruction. Instructions from the predicted instruction stream may be speculatively executed prior to execution of the branch instruction, and in any case are placed into the instruction processing pipeline prior to execution of the branch instruction. If the predicted instruction stream is correct, then the number of instructions executed per clock cycle is advantageously increased. However, if the predicted instruction stream is incorrect (i.e. one or more branch instructions are predicted incorrectly), then the instructions from the incorrectly predicted instruction stream are discarded from the instruction processing pipeline and the number of instructions executed per clock cycle is decreased.

In order to be effective, the branch prediction mechanism must be highly accurate such that the predicted instruction stream is correct as often as possible. Typically, increasing the accuracy of the branch prediction mechanism is achieved by increasing the complexity of the branch prediction mechanism. For example, a cache-line based branch prediction scheme may be employed in which branch predictions are stored with a particular cache line of instruction bytes in an instruction cache. When the cache line is fetched, the corresponding branch predictions are also fetched. As used herein, a "branch prediction" is a value which may be interpreted by the branch prediction mechanism as a prediction of whether or not a branch instruction is taken or not taken. Furthermore, a branch prediction may include the target address. For cache-line based branch prediction mechanisms, a prediction of a sequential line to the cache line being fetched is a branch prediction when no branch instructions are within the instructions being fetched from the cache line.

It is important that branch predictions be generated within a clock cycle in order to provide a subsequent fetch address to the instruction cache. Unfortunately, in a cache-line based branch prediction mechanism, the number of branch predictions stored (and hence the size of a branch prediction storage) increases with the size of the instruction cache. While branch prediction accuracy and instruction cache hit rates may be high, time elapsing during an access to the instruction and branch prediction storages may be increased as the size increases. Processing branch predictions to generate a subsequent fetch address may require additional time over reading the branch prediction data from a storage, causing the time to access the branch prediction storage to be more critical than the time for accessing the instruction storage. Still further, instruction cache access can be pipelined across multiple clock cycles without introducing a "bubble" (i.e. an empty spot in the pipeline flow) as long as a new fetch address can be provided each clock cycle. If the branch prediction cannot be formed in a single clock cycle, bubbles are introduced into the instruction processing pipeline during clock cycles that instructions cannot be fetched due to a lack of a branch prediction corresponding to a previous fetch address. Performance of the microprocessor may thereby be decreased. It is therefore desirable to provide a branch prediction storage which provides accurate branch predictions and still supports a short clock cycle time (high frequency).

SUMMARY OF THE INVENTION

The problems outlined above are in large part solved by a microprocessor in accordance with the present invention. The microprocessor stores cache-line-related data (e.g. branch predictions or predecode data, in the illustrated embodiments) in a storage which includes fewer storage locations than the number of cache lines in the instruction cache. Each storage location in the storage is mappable to multiple cache lines, any one of which can be associated with the data stored in the storage location. Advantageously, the storage may be smaller than a storage which provides an equal number of storage locations as the number of cache lines in the instruction cache. Access time to the storage may be reduced, therefore providing for a higher frequency implementation. Still further, semiconductor substrate area occupied by the storage may be decreased.

In one embodiment, the storage is indexed by a subset of the index bits used to index the instruction cache. The subset comprises the least significant bits of the cache index. In other words, the cache lines which share a particular storage location within the storage differ in the most significant cache index bits. Therefore, code which exhibits spatial locality may experience little conflict for the storage locations. Advantageously, performance may not be substantially affected by the use of fewer storage locations in the storage than cache lines in the instruction cache.

Broadly speaking, the present invention contemplates a microprocessor comprising an instruction cache and a second unit. The instruction cache includes an instruction storage wherein the instruction storage includes N cache storage locations, and wherein each of the N cache storage locations is configured to store a cache line. The second unit includes a second storage including N/M data storage locations. Each one of the N/M data storage locations corresponds to a set of M of the N cache storage locations. Data stored within the one of the N/M data storage locations corresponds to a first cache line stored within one of the set of M.

The present invention further contemplates a branch prediction unit comprising a branch prediction storage and a control unit. The branch prediction storage includes a plurality of storage locations, each one of which is configured to store a branch prediction corresponding to a first cache line. The first cache line is stored in one of a set of M cache storage locations in an instruction cache. Each of the set of M cache storage locations is mappable to the one of the plurality of storage locations. The one of the plurality of storage locations stores an indication of which one of the set of M cache storage locations is storing the first cache line. Coupled to the branch prediction storage, the control unit is configured to receive a branch misprediction indication corresponding to a second cache line. The second cache line is stored in another one of the set of M cache storage locations, and the control unit is configured to replace the branch prediction within the one of the plurality of storage locations with a second branch prediction corresponding to the second cache line upon receiving the branch misprediction indication. Additionally, the control unit is configured to update the indication of which one of the set of M cache storage locations corresponds to the one of the plurality of storage locations to indicate the another one of the set of M.

Moreover, the present invention contemplates a method for performing branch prediction in a microprocessor. A first branch prediction corresponding to a first branch instruction within a first cache line is stored in a storage location within a branch prediction storage. The storage location is selected using a first index derived from a first address identifying the first cache line. A portion of a second index derived from the first address is also stored in the storage location. The portion of the second index is excluded from the first index. The second index selects a storage location within an instruction cache for storing the first cache line. A second fetch address is predicted using the first branch prediction in response to a first fetch address having the first index if the portion of the second index derived from the first fetch address matches the portion of the second index stored in the storage location.

BRIEF DESCRIPTION OF THE DRAWINGS

Other objects and advantages of the invention will become apparent upon reading the following detailed description and upon reference to the accompanying drawings in which.

Figure 1:
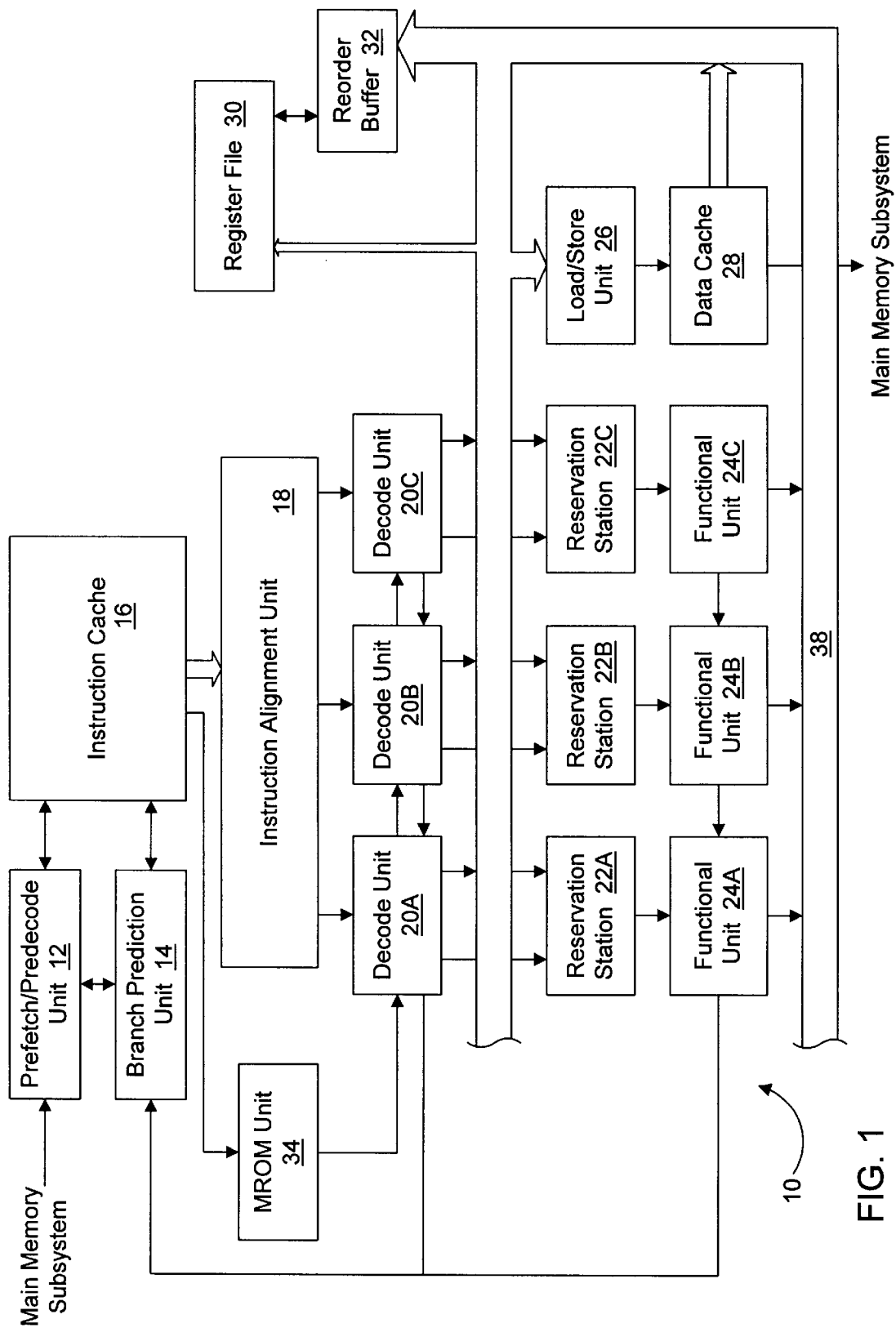
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, instruction cache 16 includes an instruction storage which includes a plurality of cache storage locations. Each cache storage location is configured to store a cache line of instruction bytes, as well as tag information corresponding to the cache line. According to one embodiment, branch prediction unit 14 includes a branch prediction storage which includes a plurality of branch prediction storage locations. Each branch prediction storage location is configured to store at least one branch prediction corresponding to a cache line. However, the total number of branch prediction storage locations is less than the total number of cache storage locations. Each branch prediction storage location is assigned to multiple cache storage locations, any one of which may be represented by a branch prediction within that branch prediction storage location. By having fewer branch prediction storage locations than cache storage locations, the branch prediction storage may be accessed in a shorter period of time than the instruction storage. The time saved by the shorter access time within the branch prediction storage may be used for processing the branch prediction to create a fetch address, which is presented to both the instruction storage and the branch prediction storage during the succeeding clock cycle. A higher frequency (shorter clock cycle) implementation may be possible through the shorter access time. Furthermore, less semiconductor substrate area may be occupied by the branch prediction storage than a branch prediction storage with a branch prediction storage location for each cache line.

If a cache line is fetched from a particular cache storage location and the corresponding branch prediction storage location is storing a branch prediction corresponding to a different cache storage location, a sequential branch prediction may be formed (i.e. the next fetch address is the next cache line in memory beyond the current fetch address). A branch misprediction may result (i.e. if a branch instruction within the cache line is taken). Upon receiving a misprediction, branch prediction unit 14 may store a branch prediction for that branch instruction in the branch prediction storage location corresponding to the cache line.

In one particular embodiment, each of the set of cache storage locations assigned to a particular branch prediction storage location has a different cache index (i.e. index corresponding to the instruction storage). The different cache indexes differ in the most significant bits of the cache indexes. Therefore, cache lines which are relatively widely separated in main memory share a branch prediction storage location. Since many programs exhibit spatial locality (in which code tends to execute within a set of cache lines relatively near each other in memory for relatively long periods of time, then move on to a different set of cache lines which are relatively near each other, etc.) the number of mispredictions due to the sharing of branch prediction storage locations among cache lines may be low. The most significant bits of the cache index corresponding to the cache line for which a branch prediction storage location is storing branch prediction(s) may be stored in the branch prediction storage location as a branch prediction tag. The branch prediction fetched during a particular clock cycle may be validated prior to use by comparing the branch prediction tag to the most significant bits of the cache index of the fetch address.

In another embodiment, prefetch/predecode unit 12 includes a predecode data storage which includes a plurality of predecode storage locations. Each predecode storage location is configured to store predecode data corresponding to a cache line. However, the total number of predecode storage locations is less than the number of cache storage locations. Each predecode storage location is assigned to a set of cache storage locations, any one of which may be represented by predecode data within a cache line. As used herein, predecoding refers to generating information corresponding to a set of instructions prior to fetching those instructions from an instruction cache for dispatch into the instruction processing pipeline of the microprocessor. By sharing a predecode storage location between multiple cache storage locations, the area occupied by the predecode data storage may be reduced. Similar to the branch prediction embodiment described above, the cache storage locations assigned to a particular predecode storage location may have cache indexes which differ in the most significant bits. For code which exhibits spatial locality, the number of instruction fetches for which predecode data is not stored in a predecode storage location may be relatively infrequent. In yet another embodiment, both the predecode data storage and the branch prediction storage include fewer storage locations then the instruction storage includes.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in a 4 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identification of an instruction that includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores a limited number of branch targets, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
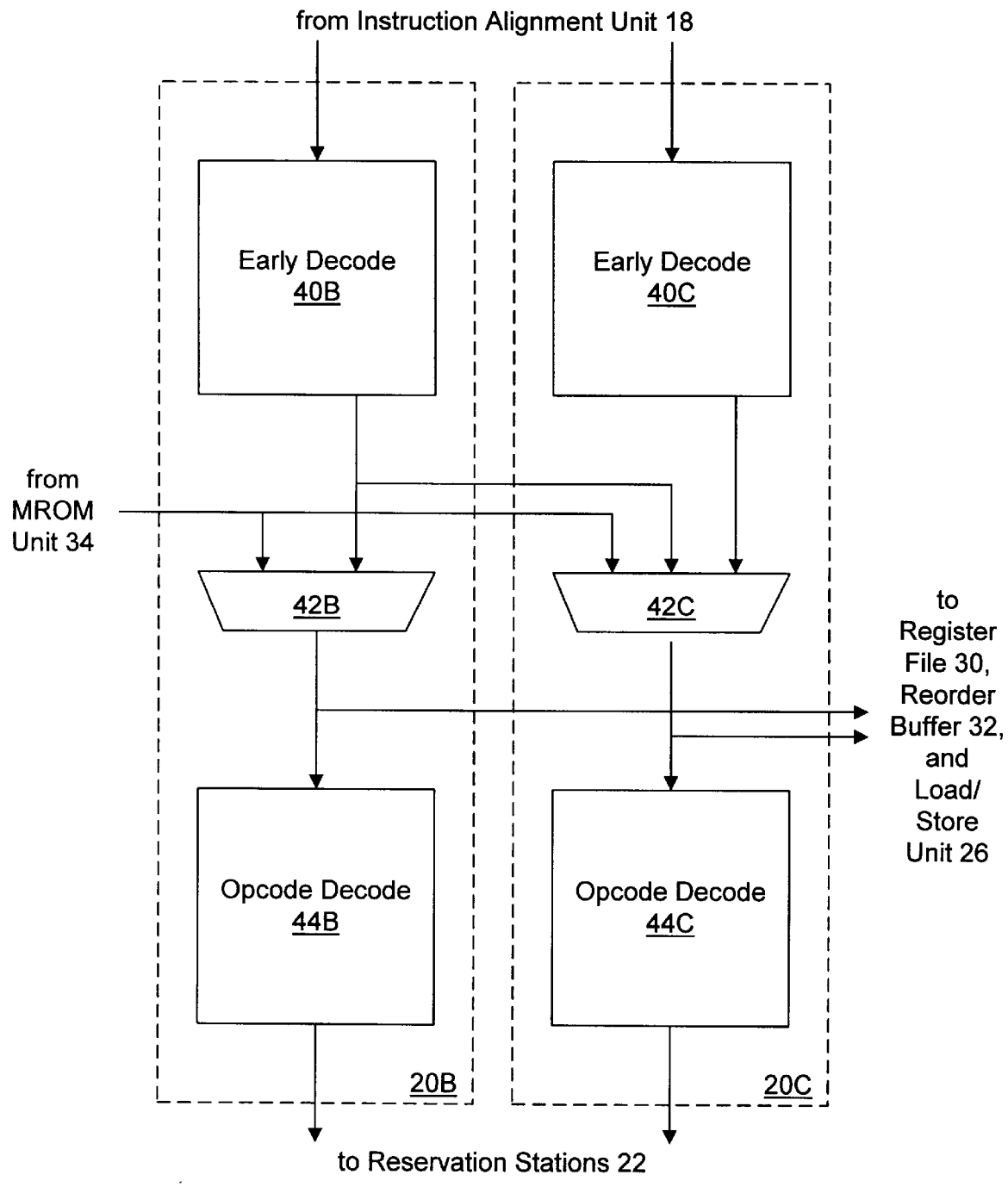
FIG. 2 is a block diagram of one embodiment of a pair of decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
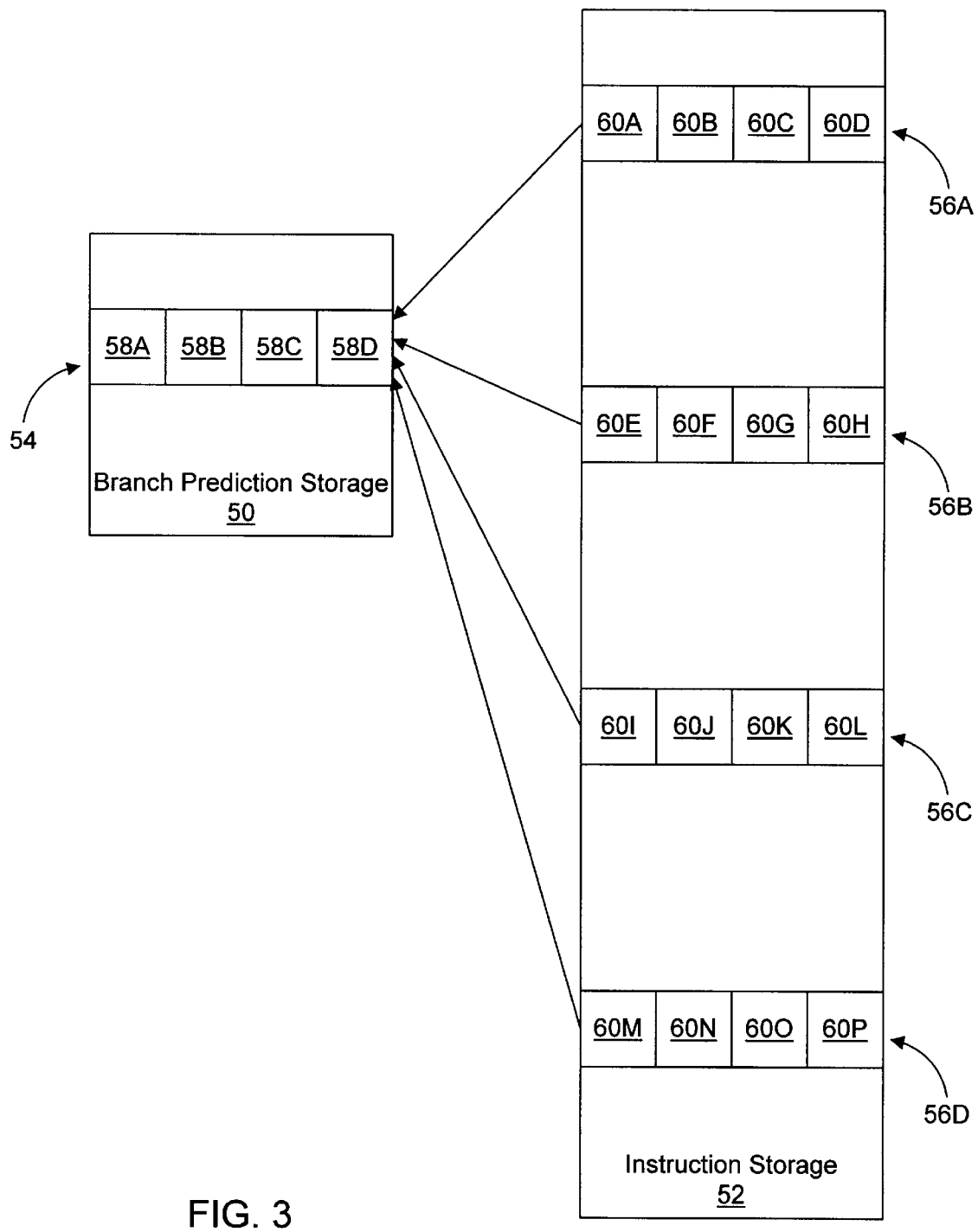
FIG. 3 is a block diagram of one embodiment of a instruction cache storage and a branch prediction storage, illustrating mapping of storage locations therebetween.

Turning now to FIG. 3, a block diagram illustrating one embodiment of a branch prediction storage 50 and one embodiment of an instruction storage 52 is shown. Other embodiments are possible and contemplated. Branch prediction storage 50 includes a plurality of rows (e.g. row 54), selected by a branch prediction index derived from the fetch address. Instruction storage 52 includes a plurality of rows as well (e.g. rows 56A, 56B, 56C, and 56D), selected by a cache index derived from the fetch address. Each row 54 and 56A–56D is illustrated as having multiple storage locations. Branch prediction storage locations 58A–58D are illustrated in row 54. Similarly, cache storage locations 60A–60D are illustrated in row 56A. Rows 56B–56D include cache storage locations 60E–60P as shown in FIG. 3.

Branch prediction storage 50 and instruction storage 52 each receive a fetch address concurrently during a clock cycle. Branch prediction storage 50 includes fewer rows than instruction storage 52. Because branch prediction storage 50 includes fewer rows than instruction storage 50, the cache index is larger (i.e. includes more bits) than the branch prediction index. According to one embodiment, the branch prediction index comprises the least significant bits of the cache index.

Rows 56A–56D within instruction storage 52 are mapped (i.e. assigned to) row 54 within branch prediction storage 50. In other words, when a fetch address selects any one of rows 56A–56D from instruction storage 52, row 54 within branch prediction storage 50 is selected by that fetch address. According to the embodiment mentioned above (in which the branch prediction index comprises the least significant bits of the cache index), the most significant bits of the cache index which are not included in the branch prediction index identify the rows within instruction storage 52 which are mapped (i.e. assigned to) the row within branch prediction storage 50 which corresponds to the branch prediction index. For example, rows 56A–56D are mapped to row 54 as shown in FIG. 3. Each of rows 56A–56D may have a respective cache index having a set of least significant bits which equal the branch prediction index locating row 54 in branch prediction storage 50. Since the most significant bits of the cache index (and hence the most significant index bits within the fetch address) are used to select one of the rows 56A–56D which share row 54, instruction code which exhibits spatial locality may experience a conflict for row 54 relatively infrequently, when code begins executing instructions within a cache line stored in a different row 56A–56D than the row 56A–56D accessed during earlier execution. If the row 56A–56D which is newly being accessed includes a branch instruction, a branch misprediction may result. The branch misprediction causes an update within row 54, and subsequently branch predictions from row 54 may be accurate. If the row 56A–56D which is newly being accessed does not include a branch instruction, then no conflict may be detected.

The embodiment in FIG. 3 illustrates multiple storage locations per row (e.g. row 54 includes branch prediction storage locations 58A–58D and row 56A includes cache storage locations 60A–60D). Each branch prediction storage location 58A–58D within row 54 is a way of row 54. FIG. 3 is therefore a set associative embodiment of branch prediction storage 50 and instruction storage 52. Other embodiments may include different numbers of ways. Additionally, other embodiments may employ other organizations (e.g. a direct-mapped organization).

Since rows 56A–56D are mapped to row 54 and further include multiple ways, a mapping between the ways of rows 56A–56D and row 54 may be assigned to define which cache storage locations 60A–60P within rows 56A–56D share a particular branch prediction storage location 58A–58D within row 54. For example, a particular way within rows 56A–56D may be assigned to the corresponding way within row 54 (e.g. cache storage locations 60A, 60E, 60I, and 60M may map to branch prediction storage location 58A, etc.). Any assignment of cache storage locations 60A–60P to branch prediction storage locations 58A–58D may be used, including dynamic reassignment.

Figure 4:
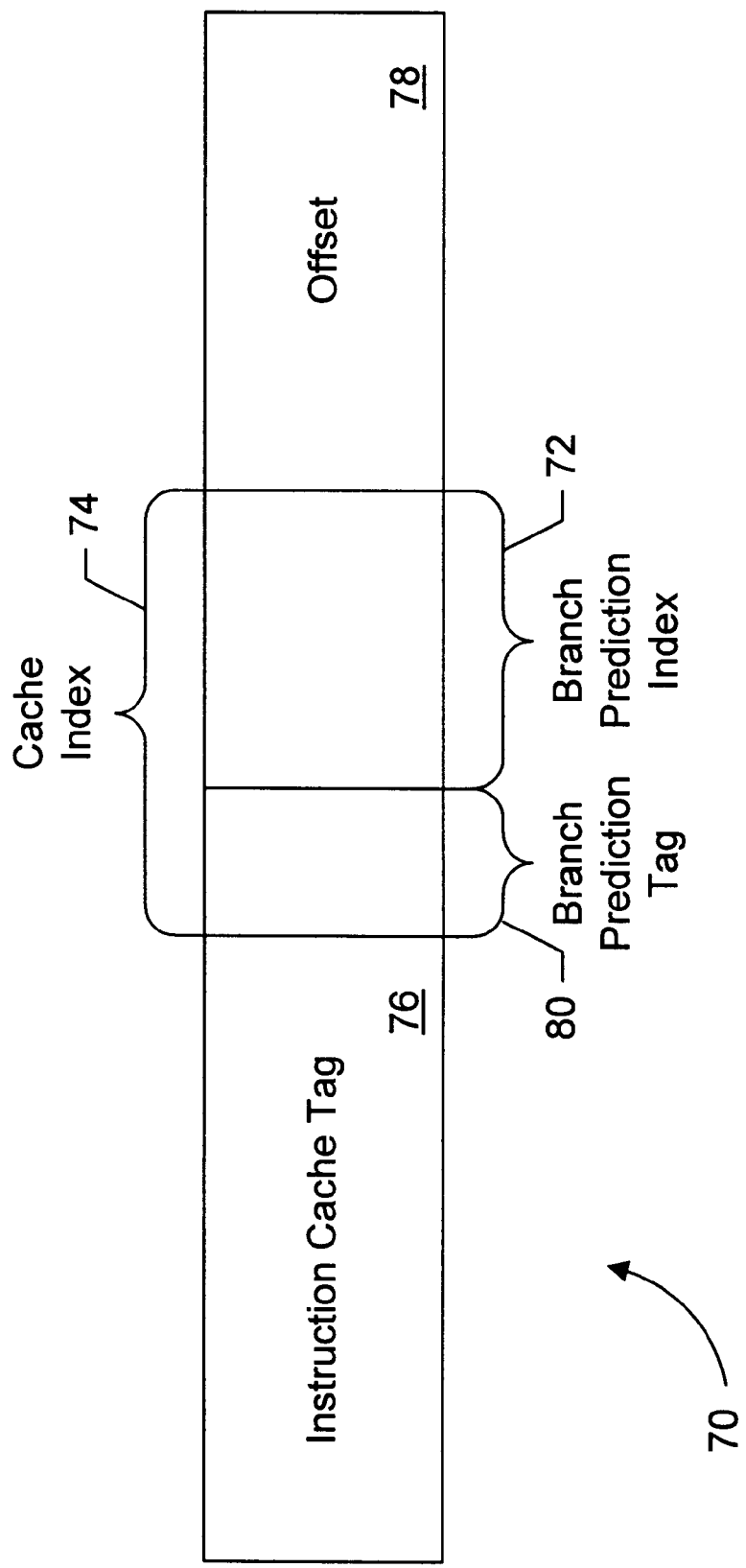
FIG. 4 is a diagram of a fetch address, portions of which are used as indexes for the instruction cache storage and the branch prediction storage shown in FIG. 3.

Turning now to FIG. 4, a fetch address 70 is shown illustrating the derivation of one embodiment of the branch prediction index 72 and one embodiment of the cache index 74. The most significant bits of fetch address 70 are on the right of fetch address 70 in FIG. 4, and the least significant bits of fetch address 70 are on the left (i.e. an instruction cache tag 76 comprises the most significant bits of fetch address 70 and an offset 78 comprises the least significant bits of fetch address 70).

Offset 78 comprises the bits of fetch address 70 which define the offset of a byte within the cache line employed by microprocessor 10. The number of bits included within offset 78 is determined by the size of the cache line. For example, offset 78 may be 5 bits if cache lines are 32 bytes in size.

Cache index 74 comprises a number of bits sufficient to select a row (e.g. rows 56A–56D) in instruction storage 52. For example, if instruction storage 52 includes 256 rows, than eight bits are included in cache index 74.

Instruction cache tag 76 comprises the remaining bits of fetch address 70. The portion of fetch address 70 in instruction cache tag 76 may be stored in instruction storage 52 along with the instruction bytes to identify the instruction bytes (e.g. to determine if a fetch address presented to instruction storage 52 is a hit or a miss in instruction storage 52). Alternatively, a separate storage having an equal number of rows and ways as instruction storage 52 may be used to store instruction cache tag 76 as well as cache line state information (e.g. valid versus invalid).

Branch prediction index 72 is also derived from fetch address 70. The number of bits within branch prediction index 72 is determined by the number of rows within branch prediction storage 50. For example, if branch prediction storage 50 includes 64 rows then branch prediction index 72 includes 6 bits.

Since the number of rows within instruction storage 52 is larger than the number of rows within branch prediction storage 50, a number of bits within cache index 74 are not included within branch prediction index 72. The bits within cache index 74 but excluded from branch prediction index 72 are illustrated in FIG. 4 as branch prediction tag 80. Branch prediction tag 80 can be stored with a branch prediction for a branch instruction within a particular cache line mapped to a branch prediction storage location via branch prediction index 72. By comparing the branch prediction tag 80 to the corresponding portion of cache index 74, branch prediction unit 14 can determine if the branch prediction (or predictions) stored within the row index by branch prediction index 72 are associated with the cache index 74 of the fetch address being presented. The branch prediction may be used if the branch prediction tag 80 matches the corresponding portion of cache index 74 (i.e. the branch prediction may be associated with a branch instruction within the instruction cache line being fetched). On the other hand, the branch prediction is not associated with the instruction cache line being fetched if branch prediction tag 80 (as stored with the branch prediction), does not match the branch prediction tag 80 of the fetch address being presented.

Figure 5:
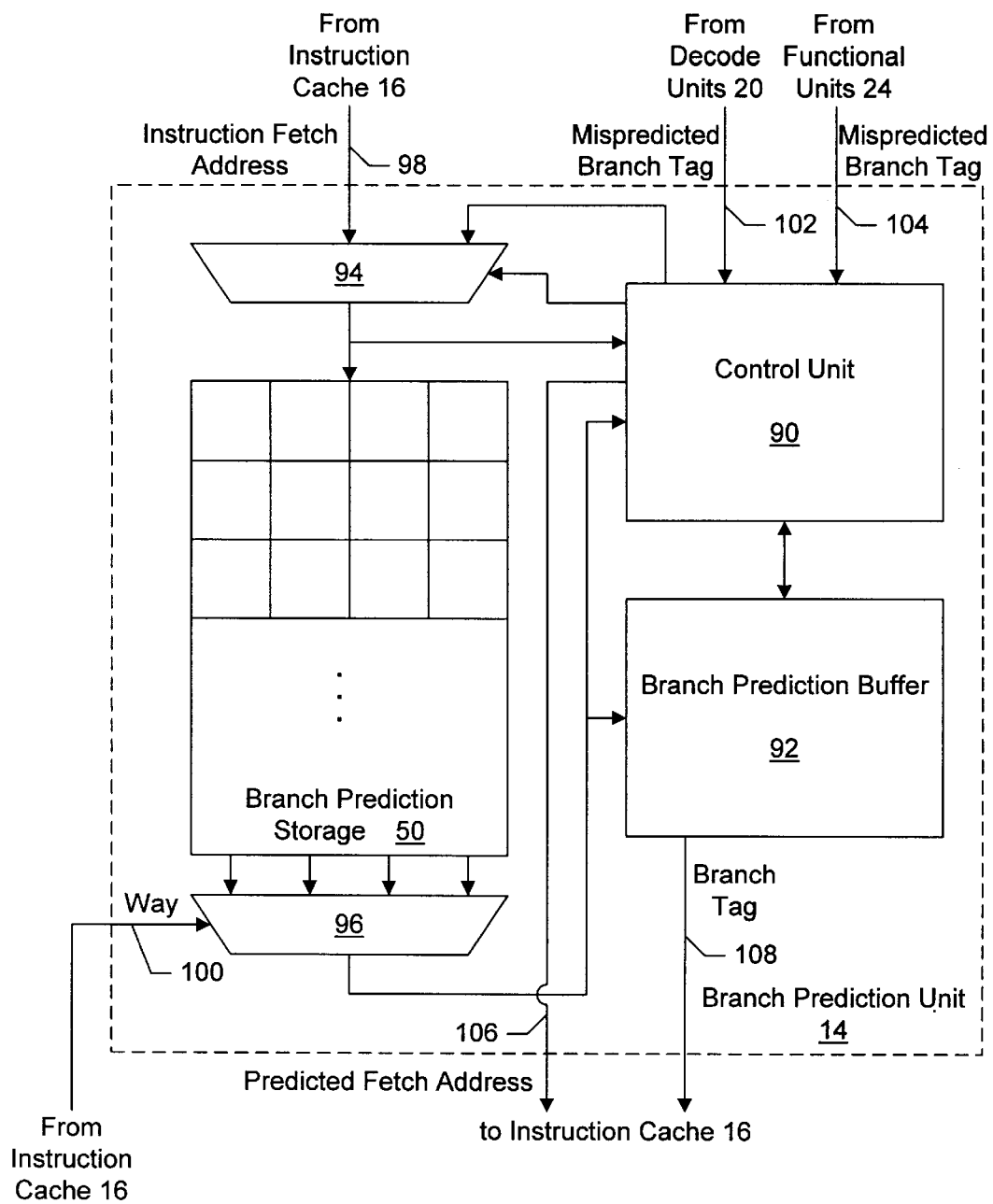
FIG. 5 is a block diagram of one embodiment of a branch prediction unit shown in FIG. 1.

Turning next to FIG. 5, a block diagram of one embodiment of branch prediction unit 14 is shown. Other embodiments are contemplated as well. As shown in FIG. 5, branch prediction unit 14 includes branch prediction storage 50, a control unit 90, a branch prediction buffer 92, an input multiplexor (mux) 94, and an output mux 96. An instruction fetch address bus 98 from instruction cache 16 is coupled as an input to input mux 94, which receives an update input from control unit 90 and a selection control from control unit 90 as well. The output of input mux 94 is coupled as an input to branch prediction storage 50, and is further coupled to control unit 90. Branch prediction storage 50 provides the branch prediction stored within each branch prediction storage location within the row indexed by the input provided by input mux 94 to output mux 96. Output mux 96 selects the branch prediction stored in one of the branch prediction storage locations in response to a way selection from instruction cache 16 (via way bus 100). Output mux 96 provides the selected branch prediction to control unit 90 and branch prediction buffer 92. Control unit 90 receives mispredicted branch tags from decode units 20 and functional units 24 via mispredicted tags buses 102 and 104, respectively. Additionally, control unit 90 provides a predicted fetch address upon a predicted fetch address bus 106 to instruction cache 16. Branch prediction buffer 92 provides a branch tag upon a branch tag bus 108 to instruction cache 16.

Generally, control unit 90 is configured to select the fetch address provided upon instruction fetch address bus 98 from instruction cache 16 to access branch prediction storage 50 through input mux 94. The fetch address indexes branch prediction storage 50 (i.e. the branch prediction index is derived from the fetch address and is used to select a row within branch prediction storage 50). Instruction cache 16 determines the way within instruction storage 52 from which a cache line is being selected, and conveys the way to output mux 96 upon way bus 100. Output mux 96 selects the corresponding way from branch prediction storage 50 and conveys the selected branch prediction (from the selected way) to control unit 90.

Control unit 90 determines a predicted fetch address using the branch prediction provided by output mux 96 and the address selected by input mux 94. Control unit 90 may select the predicted target address specified by the branch prediction if: (i) the branch prediction tag stored with the branch prediction matches the corresponding portion of the address selected by input mux 94; (ii) the offset of the branch instruction corresponding to the branch prediction is greater than or equal to the offset of the fetch address; and (iii) the branch prediction indicates that the branch is taken. If the branch prediction tag does not match the selected address, then the branch instruction corresponding to the branch prediction is stored in a different cache line (within a different row of instruction storage 52) and therefore the branch prediction should not be used. Control unit 90 may predict the address which is sequential to the address selected by input mux 94 in this case. Similarly, the sequential address may be selected if the offset of the branch instruction is less than the fetch address (indicating that the branch instruction is not being fetched). Finally, if the branch instruction is not predicted taken, then the sequential address may be selected.

Control unit 90 conveys the predicted fetch address upon predicted fetch address bus 106 to instruction cache 16. During the succeeding clock cycle, the predicted fetch address is presented upon instruction fetch address bus 98 by instruction cache 16 (and is presented to instruction storage 52 concurrently) unless a mispredicted branch, exception, or other condition causes a redirection of instruction fetching.

Control unit 90 is further configured to receive branch mispredictions from decode units 20 or functional units 24. Decode units 20 detect branch instructions which were not predicted via branch predictions within branch prediction storage 50. Functional units 24 detect branch instructions which were mispredicted (i.e. the predicted direction was found to be incorrect upon execution of the branch instruction). In order to reduce the amount of information conveyed with branch instructions into the instruction processing pipeline of microprocessor 10, branch predictions used to predict fetch addresses are stored in a branch prediction buffer 92. Branch prediction buffer 92 assigns a branch tag to the branch instruction corresponding to the branch prediction (conveyed upon branch tag bus 108). The branch tag identifies the corresponding branch prediction within branch prediction buffer 92. If a branch instruction is found to be mispredicted, the corresponding branch tag is conveyed to control unit 90 by the unit detecting the misprediction (via mispredicted branch tag buses 102 and 104). The corresponding branch prediction may thereby be updated. Sequential predictions are stored in branch prediction buffer 92 as well. A branch tag is effectively assigned to each cache line fetched from instruction cache 16.

Information stored in branch prediction buffer 92 may include the fetch address and way from which the cache line is fetched and the branch prediction information from the corresponding branch prediction storage location. The fetch address and way are used to select the branch prediction storage location for update in the case of a branch misprediction.

Additionally, control unit 90 may receive a target address and offset for a branch instruction which was not predicted from decode units 20. The branch instruction may not have been predicted because another branch instruction within the cache line is predicted by the branch prediction stored for the cache line, or because the corresponding branch prediction storage location is mapped to a different cache storage location. In either case, the correct branch prediction information may be placed into branch prediction storage 50, overwriting the previously stored branch prediction. The correct branch prediction is stored at the branch prediction index derived from the address of the branch instruction, and in the same way as the cache line including the branch instruction is stored in instruction storage 52. Additionally, the branch prediction tag stored with the branch prediction is updated with the branch prediction tag portion of the fetch address of the branch instruction.

Control unit 90 may update a branch prediction stored within branch prediction storage 50 upon receiving a mispredicted branch tag. Control unit 90 may provide the fetch address of the branch instruction which was mispredicted as an input to input mux 94, and select that input for access to branch prediction storage 50. Update data may be provided to a data port of branch prediction storage 50 for storing therein. Control unit 90 may delay updating branch prediction storage 50 until a clock cycle in which the fetch address provided by instruction cache 16 is invalid. In this manner, instruction fetching may continue uninterrupted.

It is noted that multiple branch predictions may be stored in a branch prediction storage location, according to one embodiment. Control unit 90 processes each branch prediction to select the appropriate branch prediction. It is further noted that branch prediction storage 50 may be implemented as a multi-ported storage to allow for simultaneous update due to misprediction and access to form a prediction, if desired. Such an embodiment may delete input mux 94.

Figure 6:
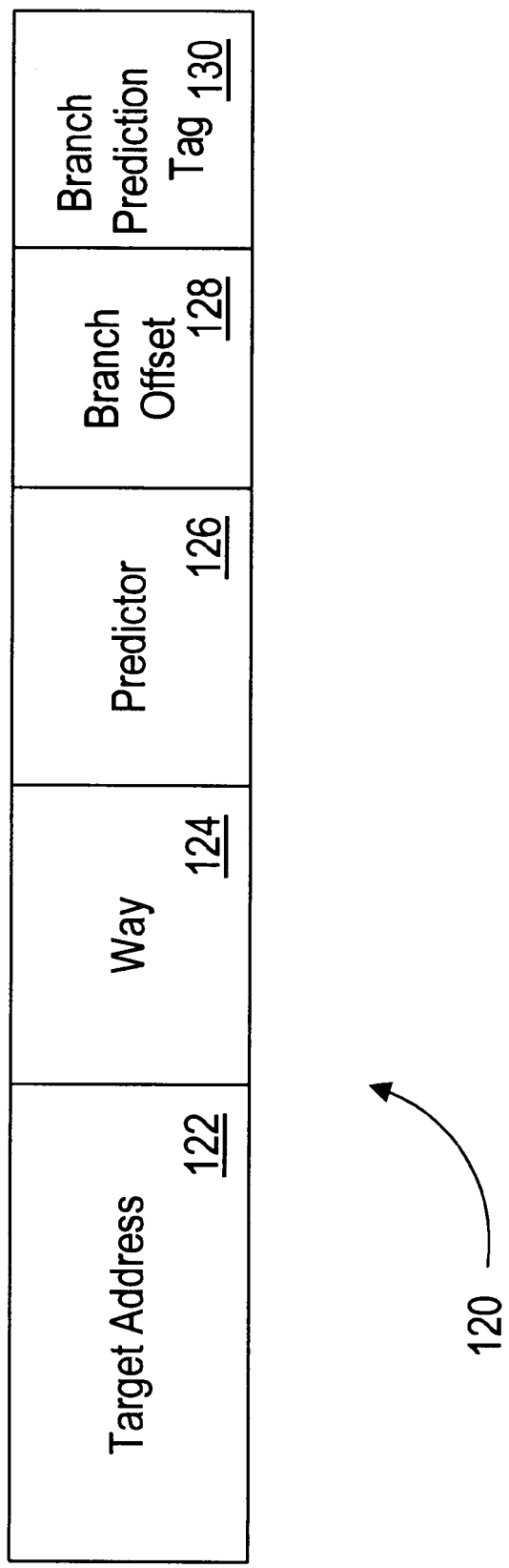
FIG. 6 is a diagram illustrating one embodiment of a branch prediction storage location.

Turning next to FIG. 6, an exemplary branch prediction 120 is shown. Branch prediction 120 may be employed by one embodiment of branch prediction unit 14 as a branch prediction stored within a branch prediction storage location. Branch prediction 120 includes a target address field 122, a way field 124, a predictor field 126, a branch offset field 128, and a branch prediction tag field 130.

Target address field 122 stores the target address of the branch instruction. According to one embodiment, the instruction cache index and offset portions of the target address are stored, and the way of the instruction cache is predicted using the value stored in way field 124. The predicted way may be verified by comparing the target address of the branch instruction (when executed) to the tag from the predicted way concatenated with the index and offset from target address field 122. If the predicted way is incorrect (i.e. the target address generated by executing the branch instruction does not match the predicted target address), the branch instruction is treated as mispredicted and the target address is used to fetch instructions from the instruction cache. The correct way is determined and is updated into the branch prediction. Alternatively, the entire target address may be stored and the way determined by comparing the instruction cache tag portion of the target address with the tags in the indexed cache line. Way field 124 may be eliminated for such an embodiment.

Predictor field 126 stores a branch predictor used to determine the taken/not taken prediction for the branch instruction corresponding to branch prediction 120. For example, predictor field 126 may comprise a saturating counter which is incremented each time the branch instruction is taken and decremented each time the branch instruction is not taken. The saturating counter may saturate at a maximum value (such that further increments have no effect) and a minimum value (such that further decrements have no effect). The most significant bit may be used as the taken/not taken prediction (taken if a binary one, not taken if a binary zero). In one particular embodiment, the branch predictor is a two bit value saturating at 11 (maximum value, in binary) and 01 (minimum value, in binary).

Branch offset field 128 records the offset of the branch instruction corresponding to branch prediction 120 within the cache line including the branch instruction. Finally, branch prediction tag field 130 is used to store the branch prediction tag 80 of the fetch address corresponding to the cache line storing the branch instruction. The branch prediction tag stored in branch prediction tag field 130 is compared to branch prediction tag 80 to determine if branch prediction 120 corresponds to a branch instruction within the cache line being fetched.

Figure 7:
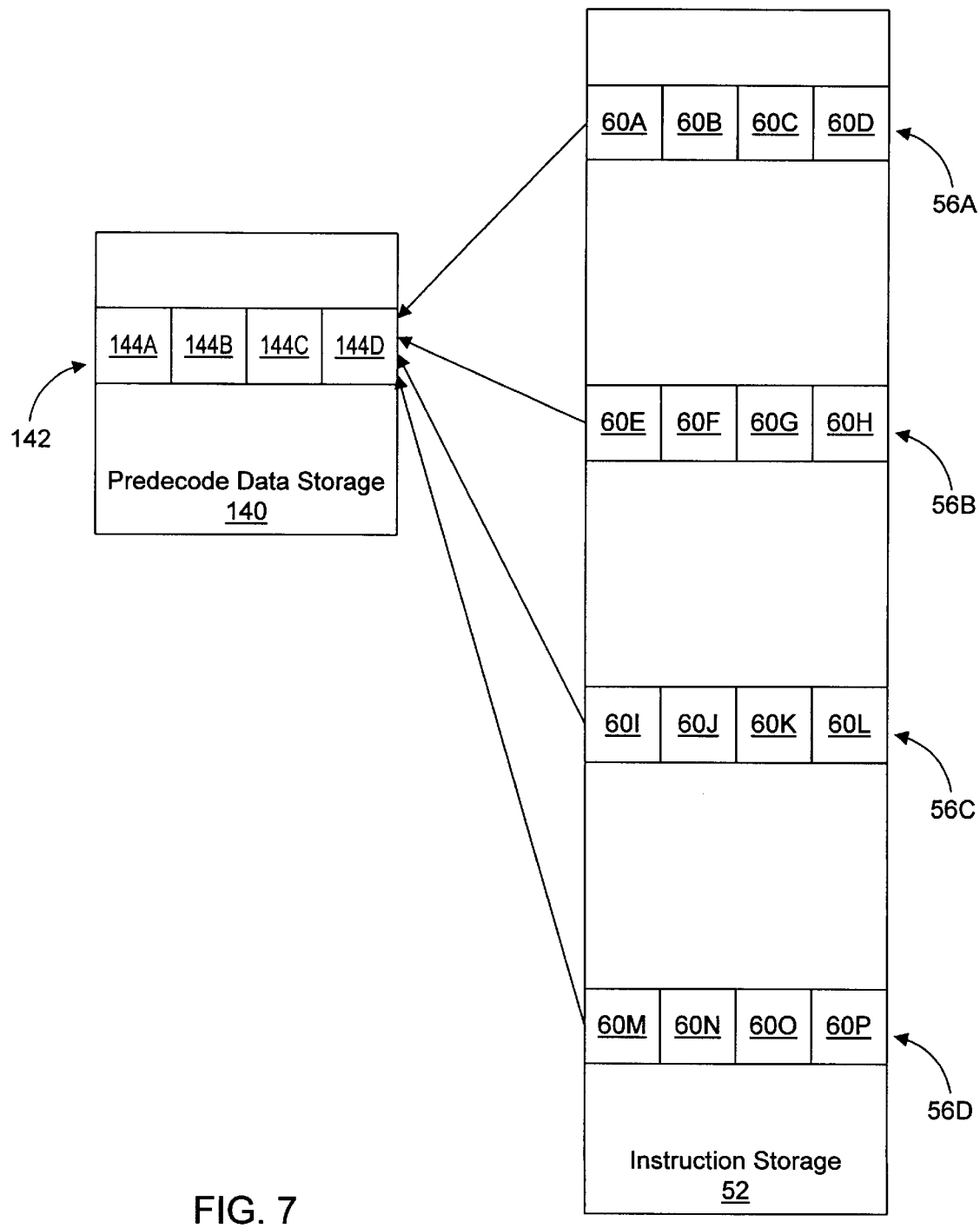
FIG. 7 is a block diagram of one embodiment of a instruction cache storage and a predecode data storage, illustrating mapping of storage locations therebetween.

Turning next to FIG. 7, a block diagram illustrating one embodiment of a predecode data storage 140 and one embodiment of an instruction storage 52 is shown. Other embodiments are possible and contemplated. Predecode data storage 140 includes a plurality of rows (e.g. row 142), selected by a predecode index derived from the fetch address. Instruction storage 52 includes a plurality of rows as well (e.g. rows 56A, 56B, 56C, and 56D), selected by an cache index derived from the fetch address. Each row 142 and 56A–56D is illustrated as having multiple storage locations. Predecode storage locations 144A–144D are illustrated in row 142. Similarly, cache storage locations 60A–60D are illustrated in row 56A. Rows 56B–56D include cache storage locations 60E–60P as shown in FIG. 7.

Predecode data storage 140 and instruction storage 52 each receive a fetch address concurrently during a clock cycle. Predecode data storage 140 includes fewer rows than instruction storage 52. Because predecode data storage 140 includes fewer rows than instruction storage 50, the cache index is larger (i.e. includes more bits) than the predecode index. According to one embodiment, the predecode index comprises the least significant bits of the cache index.

Rows 56A–56D within instruction storage 52 are mapped (i.e. assigned to) row 142 within predecode data storage 140. In other words, when a fetch address selects any one of rows 56A–56D from instruction storage 52, row 142 within predecode storage 140 is selected by that fetch address. According to the embodiment mentioned above (in which the predecode index comprises the least significant bits of the cache index), the most significant bits of the cache index which are not included in the predecode index identify the rows within instruction storage 52 which are mapped (i.e. assigned to) the row within predecode data storage 140 which corresponds to the predecode index. For example, rows 56A–56D are mapped to row 142 as shown in FIG. 7. Each of rows 56A–56D may have a respective cache index having set of least significant bits which equal the predecode index locating row 142 in predecode data storage 140. Since the most significant bits of the cache index (and hence the most significant index bits within the fetch address) are used to select one of the rows 56A–56D which share row 142, instruction code which exhibits spatial locality may experience a conflict for row 142 relatively infrequently, when code begins executing instructions within a cache line stored in a different row 56A–56D than the row 56A–56D accessed during previous execution. Upon switching which of rows 56A–56D is being fetched, predecode data corresponding to the cache lines fetched from that row may be generated and stored in the corresponding storage locations 144A–144D.

The embodiment in FIG. 7 illustrates multiple storage locations per row (e.g. row 142 includes predecode storage locations 144A–144D and row 56A includes cache storage locations 60A–60D). Each predecode storage location 144A–144D within row 142 is a way of row 142. FIG. 7 is therefore a set associative embodiment of predecode data storage 140 and instruction storage 52. Other embodiments may include different numbers of ways. Additionally, other embodiments may employ other organizations (e.g. a direct-mapped organization).

Since rows 56A–56D are mapped to row 142 and further include multiple ways, a mapping between the ways of rows 56A–56D and row 142 may be assigned to define which cache storage locations 60A–60P within rows 56A–56D share a particular predecode storage location 144A–144D within row 142. For example, a particular way within rows 56A–56D may be assigned to the corresponding way within row 142 (e.g. cache storage locations 60A, 60E, 60I, and 60M may map to predecode data storage location 144A, etc.). Any assignment of cache storage locations 60A–60P to predecode data storage locations 144A–144D may be used, including dynamic reassignment.

Figure 8:
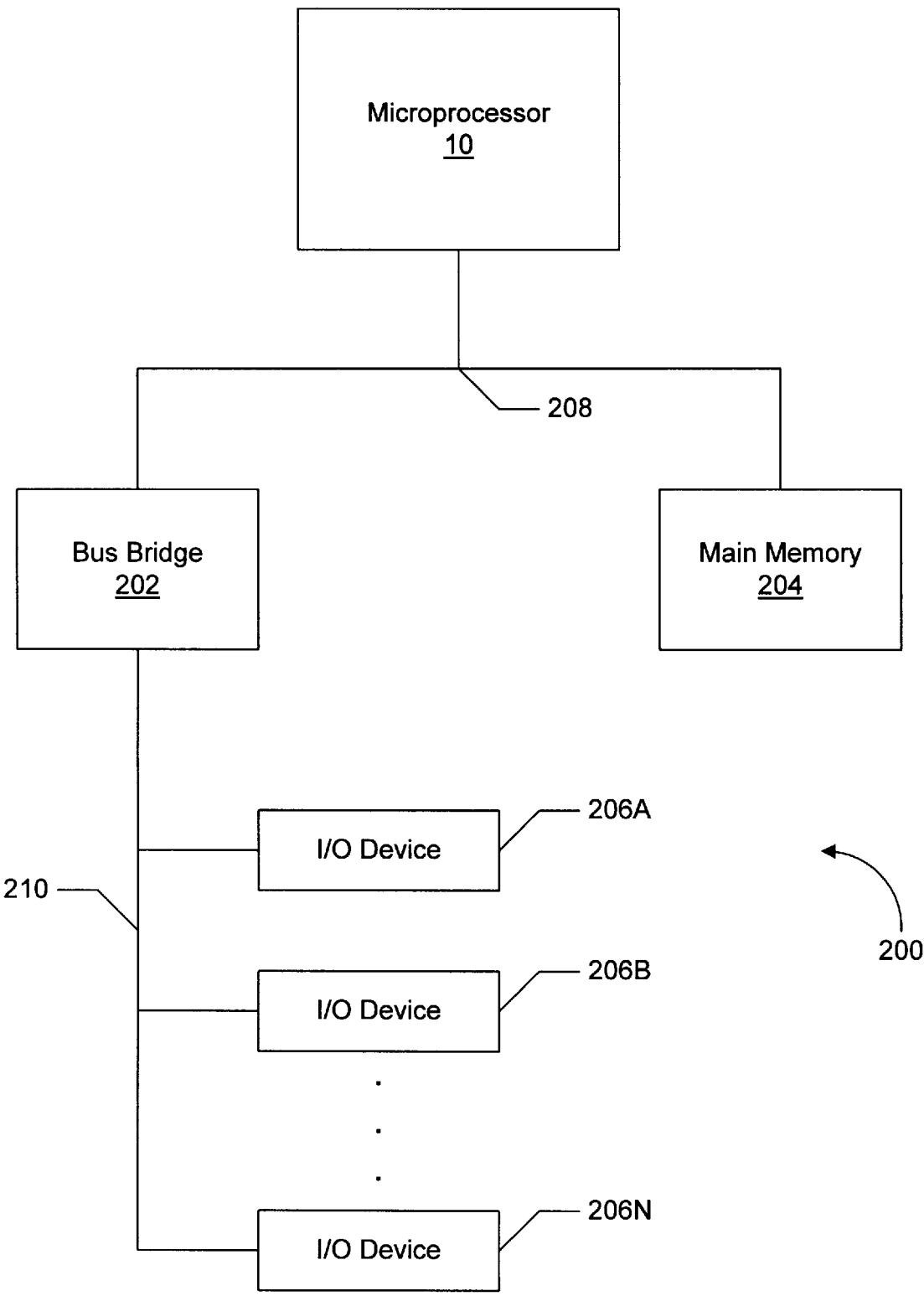
FIG. 8 is a block diagram of one embodiment of a computer system including the microprocessor shown in FIG. 1.

Turning now to FIG. 8, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary 10 devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 8 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration. It is still further noted that the functions of bus bridge 202, main memory 204, and the cache memory may be integrated into a chipset which interfaces to microprocessor 10.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |

TABLE 1-continued x86 Fast Path, Double Dispatch, and MROM Instructions

| X86 Instruction | Instruction Category |
|---|---|
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVB | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MkOM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |

TABLE 1-continued x86 Fast Path, Double Dispatch, and MROM Instructions

| X86 Instruction | Instruction Category |
|---|---|
| RSM | MROM |
| SAHF | fast path |
| SAL | fast path |
| SAR | fast path |
| SHL | fast path |
| SHR | fastpath |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TBST | fast path |
| VERR | MROM |
| VBRW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions.

In accordance with the above disclosure, a microprocessor has been shown which employs a storage for cache-line-related data (e.g. branch predictions or predecode data) which has fewer storage locations than the instruction cache. Advantageously, the access time to the storage may be less than would be otherwise possible, which may allow for processing of data read from the storage during the same clock cycle in which the information is read. Furthermore, semiconductor substrate area occupied by the storage may be reduced.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   an instruction cache including an instruction storage wherein said instruction storage includes N cache storage locations, and wherein each of said N cache storage locations is configured to store a cache line, and wherein said instruction cache is organized into cache rows, wherein a first cache row is selectable in response to an input address, and wherein each of said cache rows includes one or more of said N cache storage locations; and
   a second unit coupled to said instruction cache, wherein said second unit includes a second storage, wherein said second storage includes (N/M) data storage locations, wherein N and M are positive integers greater than zero and (N/M) is an integer less than N, and wherein each one of said (N/M) data storage locations within said second storage corresponds to M of said N cache storage locations within said instruction storage, and wherein each of said M of said N storage locations occupies a same position within different cache rows, and wherein data stored within said one of said (N/M) data storage locations corresponds to a first cache line stored within one of said M cache storage locations within said instruction storage, and wherein said second storage is organized into data rows, and wherein a first data row is selectable in response to said input address, and wherein each of said data rows includes one or more of said (N/M) data storage locations, and wherein a first number of said one or more of said (N/M) data storage locations in each of said data rows is equal to a second number of said one or more of said N storage locations in said cache row.

2. The microprocessor as recited in claim 1 wherein said input address is a fetch address and said instruction cache and said second unit are both coupled to receive said fetch address.

3. The microprocessor as recited in claim 2 wherein said instruction cache and said second unit are coupled to receive said fetch address concurrently.

4. The microprocessor as recited in claim 2 wherein said instruction storage within said instruction cache is configured to employ a first index to select one of said cache rows in response to said fetch address, and wherein said first index is derived from said fetch address.

5. The microprocessor as recited in claim 4 wherein said second storage is configured to employ a second index to select one of said data rows in response to said fetch address, and wherein said second index is derived from said fetch address, and wherein said second index excludes at least one bit of said first index.

6. The microprocessor as recited in claim 5 wherein said at least one bit comprises a most significant bit of said first index.

7. The microprocessor as recited in claim 5 wherein said at least one bit of said first index selects one of said set of M of said N cache storage locations which have said second index.

8. The microprocessor as recited in claim 5 wherein said (N/M) data storage locations in said second storage are each configured to store a tag identifying said one of said M of said N cache storage locations storing said first cache line.

9. The microprocessor as recited in claim 8 wherein said tag comprises said at least one bit of said first index.

10. The microprocessor as recited in claim 5 wherein said first index and said second index overlap.

11. The microprocessor as recited in claim 10 wherein each bit within said second index is included within said first index.

12. The microprocessor as recited in claim 1 wherein said second unit comprises a branch prediction unit.

13. The microprocessor as recited in claim 12 wherein said data stored within said one of said (N/M) data storage locations in said second storage comprises a first branch prediction corresponding to a first branch instruction within said first cache line stored within said one of said M cache storage locations within said instruction storage.

14. The microprocessor as recited in claim 13 wherein said branch prediction unit is configured to replace said data stored within said one of said (N/M) data storage locations in said second storage with a second branch prediction corresponding to a second branch instruction within a second cache line, and wherein said second cache line is stored in a different one of said M cache storage locations within said instruction storage, and wherein said branch prediction unit is configured to replace said data upon receiving a branch misprediction corresponding to said second branch instruction.

15. The microprocessor as recited in claim 1 wherein said second unit comprises a predecode unit.

16. The microprocessor as recited in claim 15 wherein said data stored within said one of said (N/M) data storage locations in said second storage comprises first predecode data corresponding to said first cache line stored within one of said M cache storage locations within said instruction storage.

17. The microprocessor as recited in claim 16 wherein said predecode unit is configured to replace said first predecode data with second predecode data corresponding to a second cache line stored within a different one of said M cache storage locations within said instruction storage, and wherein said predecode unit is configured to replace said first predecode data with said second predecode data upon fetching of said second cache line from said instruction cache.

18. A method for performing branch prediction in a microprocessor, comprising:

storing a first branch prediction in a storage location within a branch prediction storage, said storage location selected using a first index derived from a first address identifying a first cache line stored in an instruction cache, wherein said first branch prediction corresponds to a first branch instruction within said first cache line stored in said instruction cache;

storing a portion of a second index in said storage location, said portion of said second index having been excluded from said first index, said second index derived from said first address and selecting a storage location within an instruction cache for storing said first cache line, said first index selecting a storage location within said branch prediction storage; and predicting a second fetch address using said first branch prediction in response to a first fetch address having said first index if said portion of said second index derived from said first fetch address matches said portion of said second index stored in said storage location.

19. The method as recited in claim 18 further comprising:

detecting a branch misprediction corresponding to a second branch instruction within a second cache line, said second cache line identified by a second address having said first index equal to said first index of said first address but having a different second index;

updating said storage location in said branch prediction storage with a branch prediction corresponding to said second branch instruction; and updating said storage location with said portion of said second index derived from said second address identifying said second cache line.

20. A computer system comprising:

a microprocessor comprising:

an instruction cache including an instruction storage wherein said instruction storage includes N cache storage locations, and wherein each of said N cache storage locations is configured to store a cache line, and wherein said instruction cache is organized into cache rows, wherein a first cache row is selectable in response to an input address, and wherein each of said cache rows includes one or more of said N cache storage locations; and a second unit coupled to said instruction cache, wherein said second unit includes a second storage, wherein said second storage includes (N/M) data storage locations, wherein N and M are positive integers greater than zero and (N/M) is an integer less than N, and wherein each one of said (N/M) data storage locations within said second storage corresponds to M of said N cache storage locations within said instruction storage, and wherein each of said M of said N storage locations occupies a same position within different cache rows, and wherein data stored within said one of said (N/M) data storage locations corresponds to a first cache line stored within one of said M cache storage locations within said instruction storage, and wherein said second storage is organized into data rows, and wherein a first data row is selectable in response to said input address, and wherein each of said data rows includes one or more of said (NIM) data storage locations, and wherein a first number of said one or more of said (NIM) data storage locations in each of said data rows is equal to a second number of said one or more of said N storage locations in said cache row; and an input/output (I/O) device configured to communicate between said computer system and another computer system to which said I/O device is couplable.

21. The computer system as recited in claim 20 wherein said I/O device is a modem.

22. The computer system as recited in claim 20 further comprising an audio I/O device.

23. The computer system as recited in claim 22 wherein said audio I/O device is a sound card.

* * * * *

UNITED STATES PATENT AND TRADEMARK OFFICE
CERTIFICATE OF CORRECTION

PATENT NO. : 6,016,545
DATED : January 18, 2000
INVENTOR(S) : Mahalingaiah et al.

It is certified that error appears in the above-identified patent and that said Letters Patent is hereby corrected as shown below:

In the Claims:

Claim 20, col. 26, line 3, please delete "NIM" and insert --N/M--.

Claim 20, col. 26, line 5, please delete "NIM" and insert --N/M--.

Signed and Sealed this

Thirty-first Day of October, 2000

Attest:

Q. TODD DICKINSON

*Attesting Officer*       *Director of Patents and Trademarks*